US005281569A

United States Patent [19]

Amon et al.

[11] Patent Number: 5,281,569

[45] Date of Patent: Jan. 25, 1994

[54] CURABLE DESENSITIZING INK FOR THE PRINTING OF SELF-COPYING SHEETS

[75] Inventors: Albert Amon, Laussane; Laszlo K. Boksanyi, La Conversion, both of Switzerland

[73] Assignee: SICPA International S.A., Switzerland

[21] Appl. No.: 841,585

[22] Filed: Feb. 25, 1992

[30] Foreign Application Priority Data

Feb. 27, 1991 [CH] Switzerland ........................ 00592/91

[51] Int. Cl.[5] ........................ B41M 5/20; B41M 5/24; C08F 2/46

[52] U.S. Cl. .................................... 503/201; 503/205; 503/214; 522/81; 522/173; 522/174; 522/104; 522/107; 522/90; 522/96; 522/100; 522/103; 522/75

[58] Field of Search ........................ 503/205, 214, 201; 522/81, 174, 173, 909, 90, 96, 104, 107, 100, 103, 75

[56] References Cited

U.S. PATENT DOCUMENTS

| | | | |
|---|---|---|---|
| 4,073,968 | 2/1978 | Miyamoto et al. | 503/205 |
| 4,101,690 | 7/1978 | Miyamoto et al. | 503/201 |
| 4,125,636 | 11/1978 | Kamio et al. | 503/201 |
| 4,195,103 | 3/1980 | Chang | 503/201 |
| 4,268,634 | 5/1981 | Tsukahara et al. | 525/471 |
| 4,337,280 | 6/1982 | Miyamoto et al. | 503/206 |
| 4,431,450 | 2/1984 | Hasegawa et al. | 523/400 |
| 5,035,743 | 7/1991 | Amon et al. | 560/157 |

*Primary Examiner*—Susan Berman

*Attorney, Agent, or Firm*—Ostrolenk, Faber, Gerb & Soffen

[57] ABSTRACT

A desensitizing ink for printing by wet or dry offset, flexographic or typographic printing is disclosed and claimed. This ink contains at least one desensitizing agent, at least one ink binder which is polymerizable or crosslinkable by UV light or electron beam radiations and, if necessary, an initiator system. Thus, the drying time of the printings is greatly reduced. The ink is free from vaporizable ink solvents.

12 Claims, No Drawings

CURABLE DESENSITIZING INK FOR THE PRINTING OF SELF-COPYING SHEETS

FIELD OF THE INVENTION

The present invention relates to curable desensitizing inks for the printing of pressure sensitive copying sheets, shortly designed as self-copying sheets. More specifically, the invention contemplates such curable printing inks applied to an appropriate substrate by the methods of dry or wet offset printing, typographic or flexographic printing which are capable of curing, namely which chemically dry or harden under the influence of energic radiation, for example ultraviolet radiation or electron beams.

PRIOR ART AND TECHNICAL BACKGROUND

Desensitizing inks are generally known to the one skilled in the art for the preparation of passivated regions or areas of chemically self-copying sets comprising at least two superimposed sheets, generally of paper, whose contacting faces are each coated with a layer. Usually, the top sheet comprises on its back surface a nucleophilic layer, and the underlying sheet has an electrophilic layer on its upper surface. A local pressure applied to the overlaying sheet produces a chromogenic reaction between the sheets so that the underlying sheet reproduces said local pressure. Multilayer sets or stacks are also known, based on the same principle.

Several examples of such inks have already been described; a most recent development made by the Applicants is disclosed in U.S. Pat. No. 5,035,743, patented Jul. 30, 1991, and in the corresponding European Patent No. EP-B1-0,333, 645. The whole disclosure of said U.S. and European patents is incorporated herein by reference. The disclosure of these patents explains in detail the chemistry of desensitizing and also the above mentioned four printing techniques. Thus, the principles of application and function of desensitizing inks will not be repeated in this paper.

A serious problem arising during the printing with desensitizing ink is the drying of the printings after the printing process. The drying time is of very high importance since, if the drying speed is too low, there is a set-off of the printed sheets which are laid down on stacks at the outlet of the printing press, or a set-off between following layers if the printed paper is wound on rolls.

It has already been tried to speed up the drying by curing the inks under the influence of energetic radiation. It should be explained here that desensitizing inks contain non-volatile liquids, and that the drying of the printings is mainly due to absorption of said liquids in the paper. To the contrary, a "drying" by radiation is effected by rapid polymerisation of polymerizable components of the ink, and this "drying" which is so called in the printing art, is in reality a radiation initiated chemical hardening or crosslinking. However, the substances and compositions which must be added to a conventional ink in order to render them curable by exposure to rays, make them inoperative since a strong diminution or a total absence of desensitizing power has been observed.

Thus, Japanese Patent Application No. 77/91,010 of Jul. 29, 1977, referenced in Chemical Abstracts Vol. 91, No. 25 of Dec. 17, 1979, reference 212,738a, discloses a desensitizing ink for pressure sensitive copying papers containing photosensitive binders and, as the desensitizing agent, a propylene glycol diglycidyl ether diacrylate. However, this compound is also polymerized under the conditions of ink polymerisation and does not show the excellent desensitizing power of Applicants' inks according to U.S. Pat. No. 5,035,743 as explained in that reference. Furthermore, that desensitizing agent is even free from nucleophilic hydroxyl groups.

U.S. Pat. No. 4,073,969 discloses a new method to desensitize the color developer coating. This method comprises covering the color developer with a cured film thereby to desensitize the color developer. In other words, the principle of that known method is to separate the color developer from the color former by a photocured film.

SUMMARY OF THE INVENTION

There is therefore an urgent need for desensitizing inks which can be dried in a fraction of the time necessary until now, using energetic radiations. A first and major object of the invention is to fulfill this need.

Another important object of the invention is to develop desensitizing inks which have the same desensitizing power as known desensitizing inks where the drying is mainly based on solvent absorption.

It has now surprisingly been found that the desensitizing compounds disclosed in our U.S. patent mentioned above (US-A-5,035,743) can be successfully used in solvent free desensitizing inks which "dry", i.e. harden or cure under the influence of energetic radiations such as ultraviolet light (UV) or electron beams. The desensitizing inks of the invention are defined in the appended claims.

DETAILED DESCRIPTION OF THE INVENTION

Printing inks generally contain a polymeric binder which forms a thin film after printing and which holds together all ink solid components of the printings when the printings are dried. Desensitizing inks further contain a desensitizing agent, a solvent and, optionally, fillers, extenders, stabilizers, viscosity regulators and other additives. The inks of the invention are different from the known ones as it will be explained now.

The desensitizing ink of the invention comprises at least one of the nucleophilic desensitizing compounds disclosed and claimed in our U.S. Pat. No. 5,035,743. These compounds are the addition products of a mono, di or polyisocyanate and an ethoxylated and/or propoxylated derivative of a primary or secondary mono, di or polyamine or of an alkanolamine, wherein the hydroxy functionality of the derivative has been reduced after alkoxylation to a value of from 0.5 to 2 by etherification, esterification, or urethanisation. For more details, reference is again made to said U.S. patent. Preferred compounds are defined in claims 2 to 6 of this patent application.

At least part of the binder system of the ink is at least one compound or composition which is photocurable. The chemical reaction involved is a polymerisation or cross-linking. Such compositions are generally known in the art, and epoxy acrylates, polyester acrylates, polyurethane acrylates, and vinyl ethers are preferred. These photocurable compositions are generally solid or highly viscous substances, but it is preferred to use these solids in combination with a photocurable monomer or prepolymer which is liquid and which will serve as a thinner to formulate a liquid or pasty desensitizing ink.

However, these thinners are virtually not vaporizable and are rapidly polymerized or copolymerized under the influence of the said energetic radiation so that they become solid.

If the desensitizing ink is to be cured by ultraviolet light, the ink further contains a photoinitiator system. Such systems are also known per se. If inks curing by electron beams are contemplated, it is not necessary to add a photoinitiator system.

In the desensitizing inks of this invention, the reactive binder system may be combined with a conventional binder system comprising film forming polymeric compositions such as those normally used in printing inks, e.g. rosin modified phenolic resins, rosin modified maleic resins, acetobutyric resins, ketone resins or polyacrylic resins.

As a general rule, the binder system in the present desensitizing inks represents from 35 to 60% by weight of the ink. From about 40 to 100% of the binder system is constituted by the photocurable composition, and the remainder, if any, is one or more of the conventional binder resins mentioned above. The desensitizing compounds make up from about 5 to about 45% by weight of the ink, and the initiator system which is composed of an initiator and, optionally, a coinitiator, about 4 to about 10% by weight. The amount of other constituents of the ink, namely fillers and extenders such as titanium dioxide or calcium carbonate, and other additives known per se, e.g. waxes, stabilizers, viscosity regulators, etc., generally does not exceed about 10% by weight of the ink. According to the invention, the desensitizing inks are substantially free from vaporizable solvents; however, very tiny amounts which are carried as thinners of optional ink additives, can generally be tolerated and should only specially be removed if the drying time of the desensitizing inks after printing is unduly influenced.

As desensitizing agents, all compounds given in our U.S. Pat. No. 5,035,743 and described especially in the claims of that reference, can preferentially be used; their formulae will not be repeated here since the patent is incorporated by reference into the present disclosure.

The desensitizing ink of the invention has about the same desensitizing activity and power as the desensitizing ink of the U.S. reference. The drying time is tremendously shorter than that of the known ink; known, solvent containing inks have a normal drying time of about 3 to 5 seconds whereas the present inks dry in about 0.1 seconds to give an apparently dry and non set-off surface. During the following hour after printing, there is a certain post curing which does of course not affect the dry appearance of the printed surface.

The following examples are given for illustrating purposes only and will not limit the scope of the invention. The one skilled in the art will understand that any one of the desensitizing compounds claimed in US-A-5,035,743 can be used together with the particular energy radiation curable ink body. All percentages and parts are by weight.

EXAMPLE 1

A desensitizing ink is prepared for the printing by the flexographic method, and the following components are thoroughly and homogeneously blended on a three roller mill.

| | |
|---|---|
| Epoxyacrylate resin | 30 parts |
| Polyester acrylate | 10 parts |
| Dimethol triacrylate (polymerisable thinner) | 5 parts |
| Benzophenone (initiator) | 5 parts |
| 2-Chlorothioxanone (coinitiator) | 3 parts |
| Wax | 1 part |
| Hydroquinone (stabilizer) | 0.1 part |
| Desensitizing compound according to Example 1 of US-A-5,035,743 | 25 parts |
| Titanium dioxide | 20 parts |
| Fumed silica (viscosity regulator) | 0.9 part |

This ink is locally printed on the electrophilic layer of a desensitizing paper web at a dry rate of about 4 $g/m^2$. The printed paper is then dried under two lines of UV lamps mounted transversely to the running direction of the paper web. The linear UV intensity on the paper was about 60 W/cm. The printing speed was up to 200 m/min corresponding to a drying time of about 0.15 seconds. On testing the desensitizing power after 30 minutes and 10 days on a typewriter, it was found that the desensitizing effect was perfect.

EXAMPLE 2

Example 1 was repeated, with the exception that a wet offset ink was prepared and the 15 parts of the 30 parts of the epoxyarylate binder resin, thus 50% thereof, were replaced by 15 parts of a conventional binder, namely a rosin modified phenolic resin "Albertol KP 823" from Chemische Werke Hoechst, Germany.

The ink thus obtained is printed by wet offset in the printing machine of Example 1 on selected regions of a chemical self-copying sheet rendered electrophilic. The printed amount was about 2 $g/m^2$. It was found that the drying speed was still sufficient and the desensitizing power, tested as in Example 1, was perfect.

EXAMPLE 3

A desensitizing ink for electron beam drying was prepared by the general method of Example 1 by using the following components:

| | |
|---|---|
| Epoxyacrylate resin | 30 parts |
| Polyester acrylate | 10 parts |
| Trimethylolpropane triacrylate (polymerizable thinner) | 5 parts |
| Wax | 1 part |
| Hydroquinone (stabilizer) | 0.1 part |
| Desensitizing compound of Example 1 | 25 parts |
| Titanium dioxide | 20 parts |
| Fumed silica | 0.9 part |

This ink dries by electron beam radiation and was applied by wet offset printing. The results were substantially the same as those of Example 2.

The man skilled in the art will easily realize that modifications and additions are possible to obtain desensitizing inks as described above, and that these modifications and additions are within the scope of the invention as defined by the following claims.

We claim:

1. A desensitizing ink for dry and wet offset, typographic or flexographic printing on a surface of a chemical copying set comprising at least two superimposed sheets whose facing surfaces are covered with an electrophilic layer and a nucleophilic layer, respectively, adapted for a chromogenic reaction upon the application of local pressure, said ink containing at least one binder composition and at least one nucleophilic desensitizing compound which is the addition product of a mono, di or polyisocyanate and an ethoxylated or propoxylated derivative or mixed ethoxylated/propoxylated derivative of a primary or secondary mono, di or polyamine or of an alkanolamine wherein the hydroxyl functionality of the derivative has been reduced after alkoxylation to a value of from 0.5 to 2 by etherification, esterification, or urethanisation, wherein said ink contains, partially or totally replacing a non-polymerizable ink binder resin, at least one ethylenically unsaturated photocurable binder composition which is curable under the influence of ultraviolet or electron beam radiation, said ink being further essentially free from vaporizable ink solvents.

2. The ink of claim 1, wherein said nucleophilic compound has the formula (I)

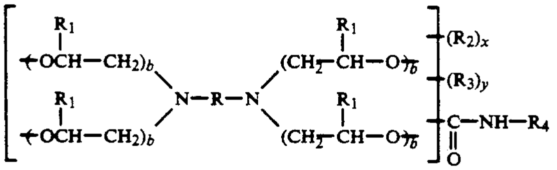

wherein:

R represents a biavalent aliphatic or bivalent aromatic radical, $R_1$ is hydrogen or a methyl group, $R_2$ is an alkyl group, $R_3$ is the acyl residue of a carboxylic acid having from 1 to 22 carbon atoms, $R_4$ is a monovalent organic group optionally substituted by one or more monovalent radicals of the formula (II)

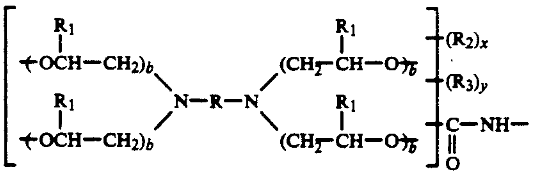

x plus y are equal to about 3, and b is a number in the range between 1 to 6.

3. The ink of claim 2, wherein R is a radical of the formula—$(CH_2)_i$—wherein i is a number between 2 to 12.

4. The ink of claim 2, wherein R is a bivalent aromatic radical.

5. The ink of claim 2, wherein $R_2$ is n-butyl.

6. The ink of claim 2, wherein said nucleophilic compound has the formula (III)

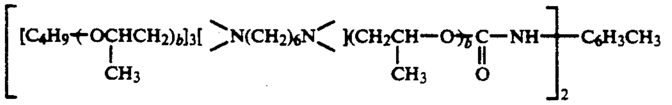

7. The ink of claim 6, wherein b is 2.

8. The ink of claim 1, wherein the photocurable binder composition comprises a polyester acrylate resin.

9. The ink of claim 1, wherein from about 40 to 100% of the non-polymerizable ink binder resin or resins are replaced by the radiation curable composition.

10. The ink of claim 1, curable under the influence of UV radiation, further containing a polymerisation initiator system sensible to UV radiation, the amount of said system being from about 4 to about 10% by weight of the total ink weight.

11. The ink of claim 1, having the following overall composition:

from about 35 to about 60% of a binder composition comprising from about 40 to 100% of said ethylenically photocurable binder composition curable under the influence of ultraviolet or electron beam radiation, from about 5 to about 45% of at least one desensitizing compound, from about 4 to about 10% of at least one photoinitiator when the ink is UV light curable, from about 10 to about 30% of mineral fillers and extenders, and further ink additives at a level of not more than about 10%, all percentages being by weight.

12. A chemical self-copying set partially desensitized by locally printing with an ink according to claim 1.

* * * * *